United States Patent [19]
Vasiliev et al.

[11] 3,860,828
[45] Jan. 14, 1975

[54] PULSED NEUTRON SOURCE

[76] Inventors: Atlant Anatolievich Vasiliev, Leningradsky prospekt, 14, kv. 129; Rakhim Ainudinovich Mescherov, Peschanaya ulitsa, 15, kv. 20; Boris Pavlovich Murin, Baltiiskaya ulitsa, 4, kv. 85, all of Moscow; Jury Yakovlevich Stavissky, Sportivnaya ulitsa, 3, kv. 9, Obninsk Kaluzhskoi oblasti, all of U.S.S.R.

[22] Filed: Aug. 30, 1972

[21] Appl. No.: 284,968

[30] Foreign Application Priority Data
May 10, 1972    U.S.S.R............................ 1778710

[52] U.S. Cl.............................. 250/501, 250/502
[51] Int. Cl............................................. G21g 3/04
[58] Field of Search.................... 250/84.5, 501, 502

[56] References Cited
UNITED STATES PATENTS
2,902,613    9/1959    Baldwin et al................ 250/84.5 X
3,268,730    8/1966    Van De Graaff................ 250/84.5
3,518,432    6/1970    Uleski............................. 250/84.5

*Primary Examiner*—Archie R. Borchelt
*Attorney, Agent, or Firm*—Holman & Stern

[57] ABSTRACT

A pulsed neutron source is disclosed comprising a high-current negative hydrogen ion H⁻ accelerator which shapes and accelerates H⁻ bunches having a preset duration and repetition interval to the energy of 0.4–1GeV, and a bunching storage ring for proton bunches furnished with a charge-exchange injecting system and with an extraction system for ejecting the proton bunches onto an external neutron-producing target, the bunching storage ring for proton bunches being designed so that the revolution period of proton bunches on the orbit thereof is equal to or is a multiple of the repetition interval of H⁻ bunches shaped in the accelerator.

2 Claims, 5 Drawing Figures

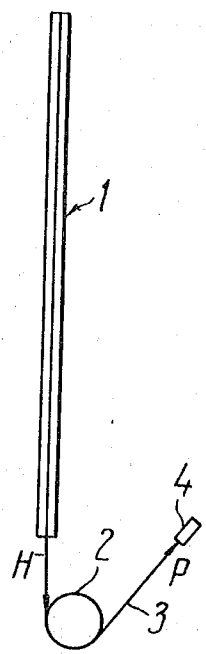
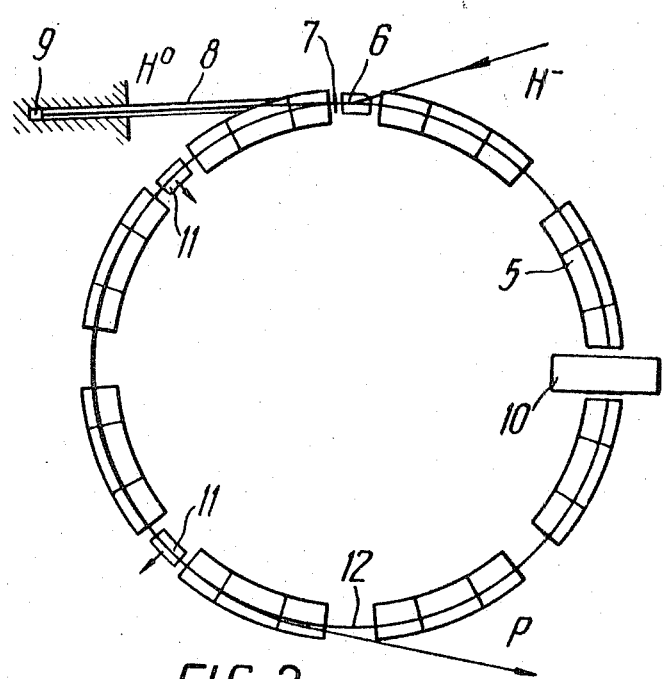
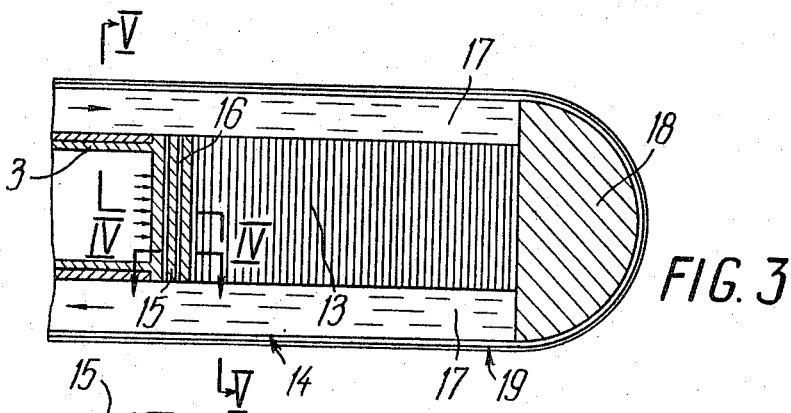
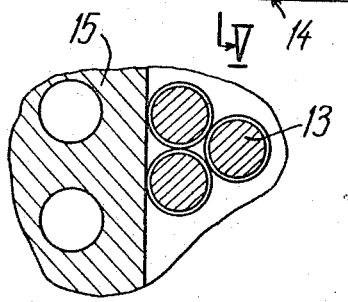
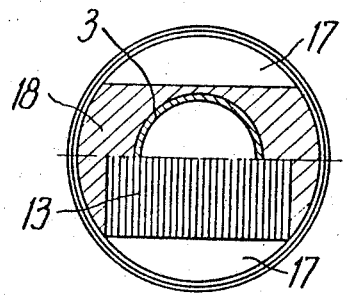

PULSED NEUTRON SOURCE

BACKGROUND OF THE INVENTION

This invention relates generally to neutron generators, and more particularly it pertains to pulsed neutron sources for generating high-intensity, periodic neutron bursts of short duration.

In the past few years, the time-of-flight neutron spectroscopy involving the use of high-intensity pulsed sources has become the basic experimental tool in neutron studies. The relative efficiency or "quality" of a time-of-flight neutron spectrometer is generally defined in terms of the factor $I/\tau^2$, wherein I denotes the mean intensity of neutrons and $\tau$ is the time uncertainty of recording the events produced by neutrons. The value of $\tau$ is determined by the duration of a neutron pulse, the time response of radiation detectors, and the neutron moderation time. Optimum durations of neutron pulses have been evaluated with due regard to the time response of diverse detectors and the moderation time in hydrogen moderators lie in the range of several nanoseconds to scores of nanoseconds, said neutron pulse duration being attainable by means of charged particle accelerators only. Specific heat evolution in the neutron-producing targets of accelerators determines the mean intensity of neutrons from said sources. With the currently used pulsed neutron sources which is based on electron linear accelerators, the specific heat evolution equals $(1-2)\times 10^3$ MeV /neutron, thereby the mean intensity of the source is limited to a value of $10^{14}$-$10^{15}$ neutrons/sec. Moreover, the disadvantages of the system are high energy requirements for electron acceleration and a high intensity of $\gamma$-radiation from the target which intereferes with neutron studies (about 100 $\gamma$-quanta per emitted neutron)

High-energy proton beams offer radical advantages so far as neutron production is concerned. At a proton energy of about 1 GeV, specific heat evolution in the neutron-producing target equals only 20–30 MeV/neutron, so that the mean intensity of the neutrons thus produced can be as high as $10^{16}$-$10^{17}$ neutrons/sec., while the $\gamma$-radiation from the source is practically absent.

A pulsed neutron source for the production of short-duration periodic neutron pulses is known, wherein proton bunches undergo bunching and said generator comprises a synchrocyclotron operated so as to "dump" onto an internal neutron-producing target the 0.4 GeV protons stacked on the outer orbits of synchrocyclotron at the end of the acceleration cycle. This operation mode provides for the production of neutron bursts (duration, about 20 nanoseconds) in the target (cf. W. W. Havens, Seminar on Intense Neutron Sources, USA, Santa Fe, September 1966).

The prior art source has disadvantages in that it imposes limitations on the mean intensity of neutrons, which intensity is governed in this instance by the maximum current of accelerated protons attainable in synchrocyclotrons (up to 2–3 mcA and accordingly, about $10^{14}$ neutrons/sec.), and exhibits a high background level due to the employment of an internal neutron-producing target disposed in the accelerator chamber, another drawback associated with the internal target being depressed efficiency of neutron slowing-down and the resulting 20- to 30-fold additional loss in intensity during moderated neutron studies.

SUMMARY OF THE INVENTION

It is an object of the present invention to provide a pulsed neutron source yielding nanosecond pulses of a mean intensity exceeding that of neutrons produced in modern high-power sources giving pulses of nanosecond duration.

It is another object of the present invention to provide an intense pulsed neutron source having an external neutron-producing target disposed outside the accelerator chamber.

It is a further object of the present invention to provide a pulsed neutron source yielding pulses of nanosecond duration and having a low intensity of $\gamma$-radiation from the target.

It is a still further object of the present invention to provide a pulsed neutron source noted for its low level of activation in equipment units and assemblies which present major difficulties in maintenance and service.

These objects are accomplished by the provision of a pulsed neutron source comprising a high-current hydrogen ion accelerator which accelerates and shapes hydrogen ion bunches to attain an energy of 0.4 to 1 GeV and directs said bunches by an extraction system onto a neutron-producing target wherein, according to the present invention, use is made of a high-current accelerator for negative hydrogen ions H$^-$, which shapes H$^-$ bunches of a pre-set duration and repetition interval and directs said bunches, by means of a charge-exchange injecting system, into a bunching storage ring for proton bunches, the revolution period of said bunches on the storage ring orbit being a multiple of the repetition interval of H$^-$ bunches at the accelerator exit, and said bunching storage ring being furnished with a phasing cavity for stabilizing the shape of the proton bunches and also with a system for extracting the proton bunches onto an external neutron-producing target made of a material selected from the group of elements having an atomic weight greater than 80.

It is expedient that the accelerator be a 0.6–0.8 GeV linear accelerator for H$^-$ ions (meson factory), that the revolution period of bunches on the storage ring orbit be a multiple of the repetition interval of H$^-$ bunches at the accelerator exit, and that the target of the charge-exchange injecting system be made of beryllium foil, further provision being made in said bunching storage ring for a phasing cavity and a single-turn extraction system for ejecting the proton bunches onto an external neutron-producing target made of closely packed uranium-238 rods with an aluminum alloy coating, said rods being cooled with water and contained in a casing which is furnished with an inlet window made of a material selected from the group consisting of aluminum and aluminum alloys.

The pulsed neutron source, according to the invention, makes it possible to produce periodic neutron pulses of nanosecond duration having a mean intensity of ca. $2\times 10^{16}$ neutrons/sec., said mean intensity being 50 to 100 times of that attained with the best up-to-date pulsed neutron sources characterized by the same pulse duration, and to employ an external neutron-producing target which is conducive to improving essentially experimental conditions. Gamma-ray emission from the target, which affects adversely neutron studies, is in this case substantially lower than that observed with intense pulsed neutron sources of other types, viz., about 100 times and 2–3 times as low as the gamma-ray emission in electron accelerators and pulsed reactors, respectively. Another advantage of the present source manifests itself in a relatively weak activation of units and assemblies (the vacuum chamber, and bunching storage ring magnetic system), which are most difficult to maintain and service.

Resorting to the charge-exchange injection technique makes for a marked simplification of the injection process and also avoids the limitations associated with beam phase volume conservation. Moreover, a high injection energy (0.4 to 1 GeV) practically eliminates limitations on intensity due to the effect of space charge.

It is noted further that both protons and negative hydrogen ions are accelerated simultaneously in linear accelerators (meson factories) providing a means for the pulsed source of the present invention to carry out, the relevant neutron experiments simultaneously with and independently of proton beam experiments, thereby expanding the experimental potential of accelerator facilities.

BRIEF DESCRIPTION OF THE DRAWINGS

Other objects and advantages of the present invention will become apparent from the following description of a specific embodiment thereof with reference to the accompanying drawings, wherein FIG. 1 is a general layout of the pulsed neutron source, according to the invention;

FIG. 2 shows a diagrammatic plan view of the proton bunching storage ring, according to the invention;

FIG. 3 is a longitudinal sectional view of the external neutron-producing target, according to the invention;

FIG. 4 is a partial cut-away view of the external neutron-producing target of FIG. 3 taken along the line IV—IV; and FIG. 5 is a sectional view of the external neutron-producing target of FIG. 3 taken along the line V—V.

DETAILED DESCRIPTION OF THE PREFERRED EMBODIMENT

FIG. 1 shows the general layout of the pulsed neutron source, according to the present invention, which comprises a high-current negative hydrogen ion accelerator 1, a bunching storage ring 2 for proton bunches, a beam transport system 3, and an external neutron-producing target 4.

In the present embodiment of the invention, the accelerator 1 is a 0.8 GeV linear accelerator (meson factory) with a mean current of 100 mcA, the time structure being macropulses of 100 to 500 mcsec. duration at a repetition frequency of 100 Hz.

Macropulse duration within the aforesaid range is selected in compliance with the design features of the accelerator 1 used and its radio-frequency system employed, while the repetition frequency of current macropulses is determined by the accelerator design features, with limitations inherent in the ion source of the accelerator 1, and with limitations on the current and intensity of the accelerated particle beam. In the contest of the present invention, the repetition frequency may be raised to several kHz.

Some form of intensity modulation should be applied to each macropulse in order to obtain a succession of bunches, wherein the duration of each bunch equals the requisite duration of a neutron pulse, while the repetition frequency equals the frequency of proton revolution in the bunching storage ring 2. The proton bunch which has been bunched on the orbit of the storage ring 2 is extracted via the transport system 3 onto the neutron-producing target 4, whereby a neutron pulse of the same duration is produced.

FIG. 2 is a schematic diagram of the bunching storage ring 2 for proton bunches made in the form of a strong-focusing ring and having the proton bunches with a revolution period equal to the repetition petition interval of H⁻ bunches shaped in the accelerator. The magnetic system of the bunching storage ring 3 is divided into eight periods, the mean induction in magnets 5 of said magnetic system being 13 kGs, while the vacuum chamber aperture equals approximately $5 \times 9$ cm². Proton injection into the bunching storage ring 2 is effected by means of a charge-exchange injection system comprising a bending magnet 6 and a charge-exchange target 7.

The charge-exchange target 7 may be made of a metal foil or an organic film or else it may consist of a gas stream, the function of said target 7 being to recharge the negative hydrogen ions to obtain protons. In the present embodiment of the invention, the target 7 comprises a beryllium foil. The particular type and material of the charge-exchange target 7 is selected to provide for effective recharging at a minimum loss of circulating proton beam emittance due to multiple scattering in said target 7.

The employment of targets fabricated from materials of a low atomic number Z (Li, Be, and C) makes it possible to attain a high degree of recharging (about 90%) at an adequately low beam expansion due to multiple scattering, beam losses because of proton-charge-exchange target nuclei interaction being likewise insignificant.

In the bunching storage ring 2, provision may be made for one or a plurality of phasing cavities intended for stabilizing the shape of proton bunches. In the particular embodiment of the invention described herein, recourse is had to one phasing cavity 10.

The single-turn extraction system comprises kicker magnets 11 which eject the circulating proton bunches onto an external neutron-producing target. With the pulsed induction of approximately 1.5 kGs in the magnets 11, beam deflection in the ejecting gap 12 is as high as 10 cm and provides for the effective ejection of bunches.

FIG. 3 shows a longitudinal section of the external neutron-producing target 4 formed by water-cooled, closely packed uranium-238 rods 13 furnished with a coating which is intended to protect the rods 13 from corrosion and the cooling water from contamination with uranium fission products. Other elements of medium or high atomic weight (A > 80) such as, for example, zirconium, lead and bismuth, are useful materials for the fabrication of the rods 13. The closely packed rods 13 are contained in a casing 14 and separated from the vacuum system of the beam transport system 3 by a thick inlet window 15 furnished with cylindrical channels 16.

The surface of the rods 13 and window 15 in the target 4 is cooled with water having an inlet temperature of 15° to 20°C which circulates through segment channels 17 built up by the casing 14, the transport system 3 and water displacement means 18. In the segment channels 17, the water volumes that adjoin the rods 13 also function as effective neutron moderators.

FIG. 4 is a partial cut-away view of the neutron-producing target of FIG. 3 taken along the line IV—IV in order to show the rods 13 that adjoin the inlet window 15.

FIG. 5 presents a sectional view of the neutron-producing target of FIG. 3 taken along the line V—V, in which there can be seen the rods 13, ion guide 3, segment channels 17, and the water displacement means 18.

Target 4 is made from a material which is selected in compliance with the conditions of carrying out the experiments on the pulsed neutron source. Thus, for example, a uranium target makes it possible to obtain mean neutron intensities of about $2 \times 10^6$ neutrons/sec. at a mean injection current of 100 mcA, but the delayed neutron background in the interpulse interval equals in this instance about 1% of the mean neutron intensity, while a bismuth target provides an intensity of about $0.8 \times 10^{16}$ neutrons/sec. at a neutron background of about 0.1%. The employment of neutron-producing targets from elements of medium atomic weight, e.g., from zirconium, results in intensity diminution to approximately $0.4 \times 10^{16}$ neutrons/sec., the neutron background in the interpulse interval being practically absent ($10^{-3}$ to $10^{-5}$%).

Cooling conditions determine the selection of a particular material for the window 15 of the neutron-producing target 4. To lower the temperature of the window 15, particularly that of the window surface on the vacuum side, it is expedient to employ a material noted for its high heat conduction, low density and, accordingly, low energy evolution due to proton ionization losses. Aluminum and aluminum alloys are eminently suited for said application, the aluminum alloys being further advantageous in that they exhibit good strength characteristics, lend themselves readily to machining, and resist corrosion in cold water. In the present embodiment of the invention, the window 15 is manufactured from duraluminum. Due to the corrosion resistance, duraluminum is also the preferred material for the protective coating of the target rods 13, the water displacement means 18 and the cooling system components (not shown in the drawings). To improve the reliability of the target, it is good practice to place the casing 14 in a thin-walled high-tensile steel cylinder.

Other modifications of the pulsed neutron source of the present invention are likewise feasible, in which the revolution periods of bunches in the bunching storage ring 2 are the multiples of the repetition interval of the bunches shaped in the accelerator, the ejection system being designed in this case so as to provide for ejecting successively onto the external neutron-producing target several proton bunches that circulate in the bunching storage ring.

The pulsed neutron source functions in the following manner.

Separate macropulses of negative hydrogen ion current from the linear accelerator 1 (FIG. 1) are extracted into the charge-exchange injection system of the bunching storage ring 2. The proton produced in the charge-exchange target 7 (FIG. 2) are stacked during the injection period. To obtain the requisite proton bunch duration, a small portion of the orbit of the bunching storage ring 2 is filled with the particles. This condition is obtained by injecting into the bunching storage ring 2 a train of bunches that emerge from the accelerator 1 at an interval equal to the revolution period of protons in the bunching storage ring 2.

The injected pulses are phased so that only one separatrix out of B possible separatrices will be filled, wherein B denotes the harmonic number of the cavity 10 radio frequency, i.e., the ratio of the frequency of the *rf* field to the revolution frequency of a bunch in the bunching storage ring. Thus, at a revolution frequency of about 8.4 MHz (revolution period, 120 nanoseconds), a proton bunch having a half-width of ca. 20 nanoseconds may be obtained at B=4 and, accordingly, at a rf field frequency of about 33.6 NHz.

The maximum permissible number of particles, N, in a circulating bunch is defined by the frequency shift of betatron oscillations $$N = 2Q / \delta Q / \beta^2 \gamma^3 / r_0 \, R \, B \, x \, S$$

wherein:

S is the beam cross-sectional area, $m^2$;

Q is the betatron number per turn;

$\delta Q$ denotes tolerance on the frequency shift of betatron oscillations;

$\beta = v/c$ where $v$ stands for proton velocity and $c$ is the velocity of light;

$\gamma = E/E_a$, where $E$ stands for total energy, and $E_a$ is the rest energy of proton;

R is the buncher radius;

$r_a = 1.5 \times 10^{18} M$

B is the circumference filling ratio.

Where $R = 4.8$ m, $Q = 1.75$, $\delta Q = 0.2$ $S = 3.14 \times 10^{-4}$ (beam diameter, 2 cm), and $B = 4$ (a proton bunch occupies ¼-th of the circumference), the value of $N$ would be $$N = 4 \times 10^{13} \text{ protons/pulse}$$

At a repetition frequency of about 100 Hz, said value of $N$ corresponds to the mean current from the target of about 0.6 mA. Insofar as the efficiencies of charge-exchange injection and single-turn ejection may be close to unity at a current off-duty factor of about 2% in the accelerator 1, the micropulse-averaged amplitude of the injection current should be of the order of 5 mA, the mean current being about 100 mcA.

The charge-exchange target 7 made of beryllium and having the optimum thickness, provides for recharging approximately 90% of negative hydrogen ions into protons. About 10% of the injected beam intensity would emerge from the charge-exchange target 7 as neutral hydrogen atoms and enter, via a vacuum channel 8, the trap 9. Circulating protons will repeatedly cross the charge-exchange target and at a revoltuion period of about 120 nsec. and an injection duration of about 200 mcsec, the average number of crossings will reach 850, the maximum ionization loss of proton energy being accordingly ca. 1.1 MeV, while the mean heat evolution in the target 7 will be about 60 W. Where use is made of a target comprising a rotating annular beryllium foil having an average diameter of about 15 cm, the mean temperature of the foil surface, provided the proton beam is about 3 cm in dia., equals, as a result of radiational cooling, about 200°C, and foil heating per pulse will not exceed 200°C.

The vacuum chamber aperture ($5 \times 9 cm^2$) is adequate for the circulation of a beam whose dimensions are defined by the synchrotron oscillations due to the presence of a rf field and the scattering of injected particles as to pulses and phases, energy losses on passage through the charge-exchange target, betatron oscillations that correspond to the injected beam emittance, multiple scattering in the charge-exchange target, and also by the space charge effect. The amplitude of synchrotron oscillations $\Delta R_e \cong R/Q^2 \Delta p/p \sim 1.6$ cm for $\Delta p/p \sim \pm 10^{-3}$. The amplitude of betatron oscillations equals approximately 1 cm at an injected beam emittance inherent in high-current proton linear accelerators. Multiple scattering in the charge-exchange target 7 would cause the betatron oscillation amplitude to increase additionally by 1 cm.

Extraction of a proton bunch shaped in the bunching storage ring 2 is effected immediately after macropulse injection termination and upon exciting the kicker magnets 11. The availability of a proton-free portion of the orbit of the bunching storage ring 2 provides an adequate time interval for field build-up in the magnets (ca. 90 nanoseconds), while the employment of betatron oscillations characterized by $Q=1.75$ provides for extracting the bunch effectively, e.g., by means of two magnets 11 spaced at a distance of two magnetic periods. The bunches thus ejected from the bunching storage ring 2 are directed via the transport system 3 onto the external neutron-producing target 4, and therein intense neutron bursts are generated of ca. 20 nanosecond duration and having a mean intensity of ca. $2\times10^{16}$ neutrons/sec. The repetition frequency of neutron pulses is governed by the excitation rate of the kicker magnets 11 and may be equal to or even greater than the injected macropulse repetition rate (ca. 100 Hz).

To minimize heat loads on the cooled surface of the window 15 (FIG. 1) and on the rods of the neutron-producing target, the proton beam should be defocused to a diameter of ca. 3 cm. The heat evolved in the target (about 120 kW in the case of a uranium-238 target) is carried away by the water that cooled the rods 13 of the target and the inlet window 15 at a rate of about 5 m/sec., the maximum heat fluxes through the water-cooled surfaces being $1.5\times10^6$ kcal / m$^2$ / hour.

The neutron-producing target 4 embodied as described hereinabove is suitable for use in conjunction with greater mean proton currents, provided a higher degree of beam defocusing is effected, viz., to a beam diameter of about 8 cm at a mean current of ca. 1 mA.

Hence, the present device makes possible the generation of neutron pulses having a duration of 20 nanoseconds and a mean intensity of ca. $2\times10^{16}$ neutrons/sec., and utilizes the potentialities offered by modern accelerating machines.

The prospects of increasing the intensity of negative hydrogen ion sources will provide the possibility of increasing the mean intensity of a similar device by at least one order of magnitude, i.e., an intensity of $2\times10^{17}$ neutrons/sec.

The exemplary embodiment of the pulsed neutron source, according to the invention described hereinabove is characterized by a mean intensity of $2\times10^{16}$ neutrons/sec. at a pulse duration of 20 nanoseconds and a repetition frequency of 100 Hz and excels, as far as said parameters are concerned, by a factor of 50 to 100 the currently available intense neutron sources which find application for research in the $1\text{eV} < E_n <$ 1MeV neutron energy range. Resorting to shorter injection pulses (beam self-modulation in linear accelerators) whose frequency is a multiple of the proton revolution frequency in the storage ring makes it possible to develop pulsed neutron sources to be used in research at higher neutron energies ($E_n > 1\text{MeV}$) wherein pulse duration is ca. 1 nanosecond, and repetition frequency equals ca. 10 kHz, mean intensity being ca. $10^{16}$ neutrons/sec. In this case, a series of pulses are circulated on the storage ring orbit, which are successively ejected onto an external neutron-producing target during the interval between injected macropulses. To depress the expansion effect experienced by the circulating beam in the storage ring due to multiple scattering in the charge-exchange target, the closed orbit shape in the storage ring, with injection process termination, is altered so as to prevent the stored beam from crossing the charge-exchange target.

What is claimed is:

1. A pulsed neutron source comprising a high-current negative hydrogen ion H$^-$ accelerator which shapes and accelerates H$^-$ bunches having a preset duration and repetition interval to the energy of ca. 0.4–1 GeV; a bunching storage ring for proton bunches, the revolution period of said proton bunches on the orbit of said bunching storage ring being a multiple of the repetition interval of said H$^-$ bunches; a charge-exchange injecting system having an inlet end, said H$^-$ bunches from said accelerator being directed into said inlet end, said H$^-$ bunches being converted in said charge-exchange system into proton bunches injected into said bunching storage ring; a phasing cavity system for stabilizing the shape of proton bunches, which are formed and circulate in said bunching storage ring; a system for extracting said proton bunches from said bunching storage ring; and an external neutron-producing target made of a material selected from the group consisting of elements having an atomic weight greater than 80, said proton bunches being ejected onto said target to yield neutron pulses.

2. A pulsed neutron source comprising a high-current linear accelerator of negative hydrogen ions H$^-$ which shapes and accelerates to an energy of 0.6–0.8 GeV H$^-$ bunches having a preset duration and repetition interval; a bunching storage ring for proton bunches in which the revolution period of protons on the orbit of said bunching storage ring equals the repetition period of said H$^-$ bunches; a charge-exchange target made of beryllium foil onto which are directed H$^-$ bunches from said accelerator, said H$^-$ bunches being converted in said charge-exchange target into proton bunches injected into said bunching storage ring; a phasing cavity for stabilizing the proton bunch that forms and circulates in said bunching storage ring; a single-turn extraction system for ejecting said proton bunch from said bunching storage ring; an external neutron-producing target made of closely packed $^{238}$U rods having an aluminum alloy coating, said rods being cooled with water; a casing of said external neutron-producing target which accommodates said closely packed rods; and an inlet window of said casing made of a material selected from the group consisting of aluminum and aluminum alloys.

* * * * *